United States Patent [19]

Sakashita

[11] 4,076,439
[45] Feb. 28, 1978

[54] CORNER PIECE FOR MITER JOINT

[75] Inventor: Masami Sakashita, Kurobe, Japan

[73] Assignee: Yoshida Kogyo K.K., Tokyo, Japan

[21] Appl. No.: 709,339

[22] Filed: Jul. 28, 1976

[30] Foreign Application Priority Data

Sep. 1, 1975 Japan .................................. 50-121020

[51] Int. Cl.² .............................................. F16B 7/18
[52] U.S. Cl. ................................... 403/402; 403/231;
52/476; 52/656
[58] Field of Search ........................ 403/231, 401, 402;
52/753 C, 753 D, 758 H, 656, 657, 475, 476

[56] References Cited

U.S. PATENT DOCUMENTS

| 2,538,138 | 1/1951 | Webster | 403/401 |
| 2,972,396 | 2/1961 | Minick | 403/401 |

FOREIGN PATENT DOCUMENTS

| 1,314,239 | 11/1962 | France | 403/401 |
| 280,079 | 11/1964 | Netherlands | 403/402 |

Primary Examiner—Wayne L. Shedd
Attorney, Agent, or Firm—Hill, Gross, Simpson, Van Santen, Steadman, Chiara & Simpson

[57] ABSTRACT

A pair of frame members have ends beveled at an angle of 45° and mated with one another to provide a miter joint. The frame members have perpendicularly arranged plates each having an opening adjacent its one end to provide a separate end portion. A corner angle is mounted on the plates and has a pair of legs each having a projection of a V-shaped cross-section received in one of the openings. The V-shaped projections jointly provide a pair of substantially parallel members for clamping the separate end portions, the parallel members being fastened together by a screw passing therethrough. As the screw is tightened, the clamping members are moved closer to fasten the separate end portions securely together and to press the angle legs against the plates of the frame members.

2 Claims, 3 Drawing Figures

U.S. Patent    Feb. 28, 1978    4,076,439
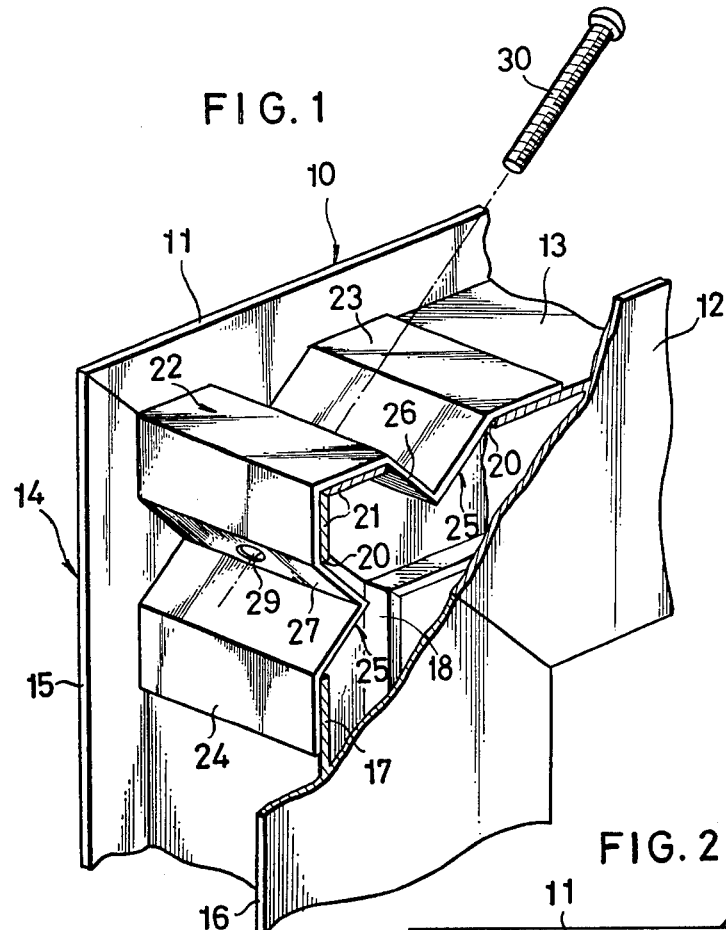
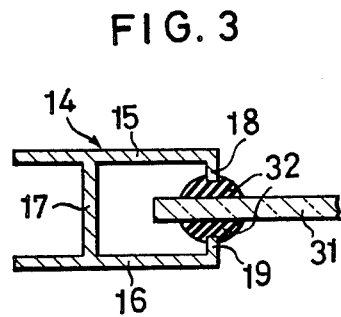
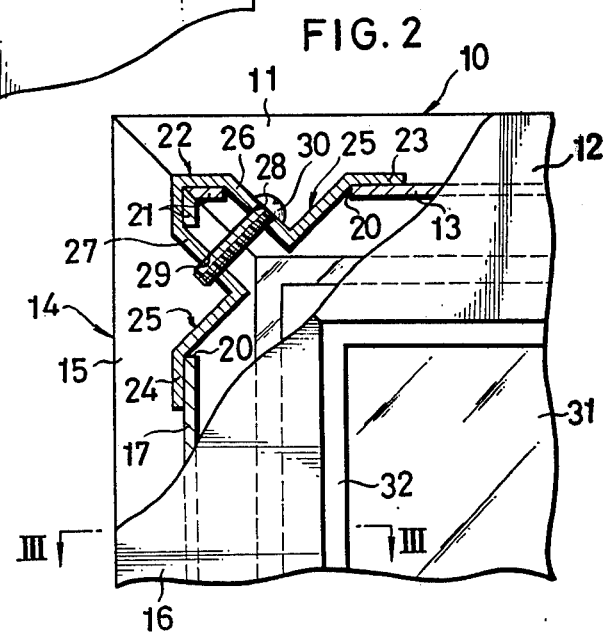

CORNER PIECE FOR MITER JOINT

BACKGROUND OF THE INVENTION

1. Field of the Invention

The present invention relates to a corner angle or piece for a miter joint for corners of window or door frames.

2. Prior Art

Miter joints have found extensive use in interconnecting perpendicularly arranged frame members as in windows or doors. Ends of the frame members are beveled at an angle of 45° and mated with each other. The mitered ends are secured together typically by a corner angle fixed to the ends of the frame members.

For example, U.S. Pat. No. 3,812,621, issued May 28, 1974 shows a simple form of corner angle for connecting door frames together. The corner angle disclosed is an L-shaped clip held in a clip raceway formed on the frame members. The clip is made of a flat thin plate that cannot withstand excessive loads imposed thereon.

Another form of corner angle that has been used for joining window frames is disclosed in U.S. Pat. No. 3,782,054, issued Jan. 1, 1974. This corner angle comprises a single piece channel member made from spring steel. The angle has a pair of legs insertable into openings in the beveled ends of the window frames. The corner angle, when attached, forms a tight fit with the frame members. With this structure, however, dimensional tolerance for the openings must be held to a minumum to allow the angle legs to be inserted adequately. Further, the angle form needs to be highly accurate, and its fabrication is a relatively complicated task.

SUMMARY OF THE INVENTION

According to the present invention, a corner angle has a pair of legs each having a projection of a V-shaped cross-section received in an opening formed adjacent to an end of one of a pair of angularly connected plates of a pair of frame members. The V-shaped projections jointly provide a pair of substantially parallel members for clamping separate end portions provided by the openings. The clamping members are interconnected by a screw passing therethrough.

Accordingly, it is an object of the present invention to provide a corner piece for miter joints which is simple in structure and has increased mechanical strength.

Another object of the present invention is to provide a corner piece which can be readily manufactured as by pressing and installed with ease.

A still further object of the present invention is to provide a corner piece the formation of which does not need to be highly accurate.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

BRIEF DESCRIPTION OF THE DRAWINGS

FIG. 1 is a fragmentary perspective view, with parts broken away, of mitered ends of frame members secured by a corner piece constructed in accordance with the present invention;

FIG. 2 is a partially cut away front elevational view of the miter joint shown in FIG. 1 with the corner piece clamped in place by a screw; and FIG. 3 is a horizontal cross-sectional view taken along line III — III of FIG. 2.

DESCRIPTION OF THE PREFERRED EMBODIMENT

In FIG. 1, a horizontal structural frame member 10 has a pair of parallel spaced walls 11, 12 and a connector plate 13 formed integrally with and extending between the walls 11, 12. Similarly, a vertical structural frame member 14 has a pair of parallel spaced walls 15, 16 and a connector plate 17 formed integrally with and extending between the walls 15, 16. Ends of the horizontal and vertical members 10, 14 that are to be interconnected are beveled at a suitable angle, herein shown to be 45°, so that the mated ends will provide an angle corner. Each of the frame members 10, 14 has a pair of opposed flanges 18, 19 (FIG. 3) extending along inner edges of the spaced walls.

Each of the connector plates 13, 17 has a pair of openings 20 adjacent to its ends, only one of the openings being shown here for clarity of illustration. There is thus a separate end portion 21 formed by the opening 20.

A corner piece 22 provided in accordance with the present invention is made of an angle plate having substantially the same width as that of the connector plates 13, 17. The corner piece 22 comprises a pair of legs 23, 24 each having a central portion 25 corresponding in position to the opening 20 in one of the connector plates 13, 17, the central portion 25 projecting inwardly to provide a V-shaped cross-section. The projecting portion 25, when the corner piece 22 is installed, is received in the opening 20 in the connector plate. The projection 25 may be of any other suitable cross-section provided that it can be retained in place in the opening 20.

As better shown in FIG. 2, the V-shaped projections 25 jointly provide a pair of clamping members 26, 27 which are parallel or substantially parallel to each other. The clamping members 26, 27 have at least a pair of apertures 28, 29 formed therethrough, respectively, only the aperture 29 being internally threaded and the aperture 28 being slightly larger in diameter than a machine screw 30 to enable it to pass therethrough.

When the horizontal and vertical frame members 13, 17 are to be connected together, their beveled ends are mated with each other and the corner piece 22 is mounted on the angularly connected plates 13, 17 with the projections 25, 25 received in the openings 20, 20. The machine screw 30 first enters the unthreaded aperture 28 and is then threaded into the aperture 29 to interconnect the clamping members 26, 27. As the screw 30 is tightened further, the clamping members 26, 27 are drawn closer together to hold the end portions 21 firmly together by means of the proximal ends of the angle legs 23, 24. Simultaneously, the distal ends of the legs 23, 24 are pressed against the marginal ends of the connector plates 13, 17 that bound the openings 20, 20. The proximal ends of the legs are prevented from being displaced away from the end portions 21, 21 by the deflected clamping members 26, 27. Thus, the horizontal and vertical frame members 10, 14 are securely held together at their miter joint.

At the time the frame members are assembled, a panel 31 such as a sheet of glass is mounted. More specifically, the marginal edges of the panel 31 are inserted between the spaced walls of all of the frame members with a pair of perimetric gasket members 32, 32 of rubber interposed between the flange 18 and the panel 31, and between the flange 19 and the panel 31, respectively.

A bolt with a nut may be employed in place of the machine screw 30. In that case, the aperture 29 need not be tapped. Instead, it must have a diameter slightly larger than the bolt diameter.

Although various minor modifications may be suggested by those versed in the art, it should be understood that I wish to embody within the scope of the patent warranted hereon, all such embodiments as reasonably and properly come within the scope of my contribution to the art.

What I claim as my invention:

1. A frame joint comprising:
   a. a pair of perpendicularly arranged frame members each having an H-shaped cross-section defined by a pair of spaced outer walls and a connector plate extending therebetween for receiving and supporting a panel between said spaced outer walls at one side of said connector plate, the ends of said H-shaped members being angularly mated with each other, each of said connector plates having a rectangular opening therein adjacent its mated end providing an end portion therebetween;
   b. a corner angle piece of uniform thickness having legs disposed against the other sides of said connector plates, each said leg having a portion formed as a projection received in one of said rectangular openings, the edges of said legs engaging said outer walls, said angle piece having a continuous corner portion extending about said end portions; and
   c. means clamping said continuous corner portion to said end portions.

2. A frame joint construction according to claim 1 in which said opening spans the space between said spaced walls so that said end portion is separate from the rest of said connector plate.

* * * * *